US012736397B2

(12) United States Patent
Sheinin et al.

(10) Patent No.: US 12,736,397 B2
(45) Date of Patent: Sep. 15, 2026

(54) SYSTEM, METHOD, AND COMPUTER PROGRAM PRODUCT FOR OPTICAL VIBRATION SENSING

(71) Applicant: Carnegie Mellon University, Pittsburgh, PA (US)

(72) Inventors: Mark Sheinin, Pittsburgh, PA (US); Matthew O'Toole, Pittsburgh, PA (US); Srinivasa Narasimhan, Pittsburgh, PA (US); Dorian Yao Chan, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 18/720,862

(22) PCT Filed: Dec. 19, 2022

(86) PCT No.: PCT/US2022/053342

§ 371 (c)(1),
(2) Date: Jun. 17, 2024

(87) PCT Pub. No.: WO2023/114535

PCT Pub. Date: Jun. 22, 2023

(65) Prior Publication Data

US 2025/0060244 A1 Feb. 20, 2025

Related U.S. Application Data

(60) Provisional application No. 63/291,005, filed on Dec. 17, 2021.

(51) Int. Cl.
*G01H 9/00* (2006.01)
*G06T 7/20* (2017.01)
(Continued)

(52) U.S. Cl.
CPC ................ *G01H 9/00* (2013.01); *G06T 7/20* (2013.01); *H04N 23/45* (2023.01); *H04N 23/55* (2023.01); *H04N 23/56* (2023.01)

(58) Field of Classification Search
CPC ... G01H 9/00; G06T 7/20; G06T 2207/10016; G06T 7/262; H04N 23/45; H04N 23/55; H04N 23/56
See application file for complete search history.

(56) References Cited

U.S. PATENT DOCUMENTS 9,923,339 B2 3/2018 Chan et al.
2006/0262319 A1 11/2006 Gatt
(Continued)

FOREIGN PATENT DOCUMENTS

DE 10137817 A1 * 2/2003 ............. G08G 1/167
JP 2020085829 A2 6/2020
(Continued)

OTHER PUBLICATIONS

Rasouli (NPL, "Rotation-sensitive and direction resolved homodyne laser-doppler vibrometry . . . " Optics Express, 2020).*
(Continued)

*Primary Examiner* — Shadan E Haghani
(74) *Attorney, Agent, or Firm* — The Webb Law Firm

(57) ABSTRACT

Provided are systems, methods, and computer program products for optical vibration sensing. The system includes a first visual sensor, a second visual sensor, and at least one processor in communication with the first visual sensor and the second visual sensor, the at least one processor configured to: capture at least one first image comprising at least one light on at least one object with the first visual sensor, capture at least one second image comprising the at least one light on the at least one object with the second visual sensor, and determine a vibration of the at least one object based on
(Continued)

the at least one light captured in the at least one first image and the at least one second image.

19 Claims, 5 Drawing Sheets

(51) Int. Cl.

| | |
|---|---|
| ***H04N 23/45*** | (2023.01) |
| ***H04N 23/55*** | (2023.01) |
| ***H04N 23/56*** | (2023.01) |

(56) References Cited

U.S. PATENT DOCUMENTS

| | | | | |
|---|---|---|---|---|
| 2015/0215547 | A1* | 7/2015 | Muller | H04N 5/265 348/598 |
| 2016/0021475 | A1 | 1/2016 | Moore et al. | |
| 2018/0224266 | A1* | 8/2018 | Perea | G01B 9/02007 |
| 2019/0142265 | A1* | 5/2019 | Bos | A61B 1/00006 600/188 |
| 2020/0205770 | A1* | 7/2020 | Friedman | H04R 1/46 |
| 2022/0319013 | A1* | 10/2022 | Yamamoto | G01P 3/36 |

FOREIGN PATENT DOCUMENTS

| | | | |
|---|---|---|---|
| WO | 0057127 | A1 | 9/2000 |
| WO | 2006075263 | A1 | 7/2006 |
| WO | 2013185937 | A1 | 12/2013 |

OTHER PUBLICATIONS

Bianchi et al., “Long-range detection of acoustic vibrations by speckle tracking”, Applied optics, 2019, pp. 7805-7809, vol. 58, No. 28.

Buyukozturk et al., “Smaller than the eye can see: Vibration analysis with video cameras”, In 19th World Conference on Non-Destructive Testing, WCNDT, 2016, vol. 1.

Chen et al., “Video camera-based vibration measurement for civil infrastructure applications”, Journal of Infrastructure Systems, 2017, p. B4016013, vol. 23, No. 3.

Davis et al., “Visual vibrometry: Estimating material properties from small motion in video”, In Proceedings of the IEEE conference on computer vision and pattern recognition, 2015, pp. 5335-5343.

Davis et al., “The visual microphone: Passive recovery of sound from video”, 2014.

Jo et al., “Spedo: 6 dof ego-motion sensor using speckle defocus imaging”, In Proceedings of the IEEE International Conference on Computer Vision, 2015, pp. 4319-4327.

Smith et al., “CoLux: Multi-object 3d micro-motion analysis using speckle imaging”, ACM Transactions on Graphics (TOG), 2017, pp. 1-12, vol. 36, No. 4.

Weinberg et al., “100,000 frames-per-second compressive imaging with a conventional rolling-shutter camera by random point-spread-function engineering”, Optics Express, 2020, pp. 30616-30625, vol. 28, No. 21.

Wu et al., “Fast motion estimation of one-dimensional laser speckle image and its application on real-time audio signal acquisition”, In Proceedings of the 6th International Conference on Communication and Information Processing, 2020, pp. 128-134.

Wu et al., “The 20k samples-per-second real time detection of acoustic vibration based on displacement estimation of one-dimensional laser speckle images”, Sensors, 2021, p. 2938, vol. 21, No. 9.

Zalevsky et al., “Simultaneous remote extraction of multiple speech sources and heart beats from secondary speckles pattern”, Optics express, 2009, pp. 21566-21580, vol. 17, No. 24.

Zhang et al., “Vibrosight: Long-range vibrometry for smart environment sensing”, In Proceedings of the 31st Annual ACM Symposium on User Interface Software and Technology, 2018, pp. 225-236.

Zizka et al., “SpeckleSense: fast, precise, low-cost and compact motion sensing using laser speckle”, In Proceedings of the 24th annual ACM symposium on User interface software and technology, 2011, pp. 489-498.

* cited by examiner

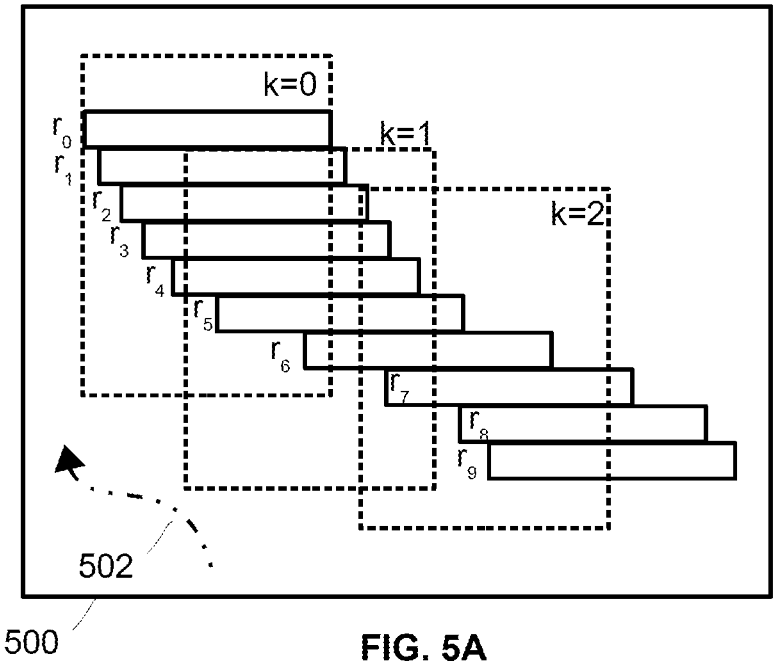
FIG. 5A
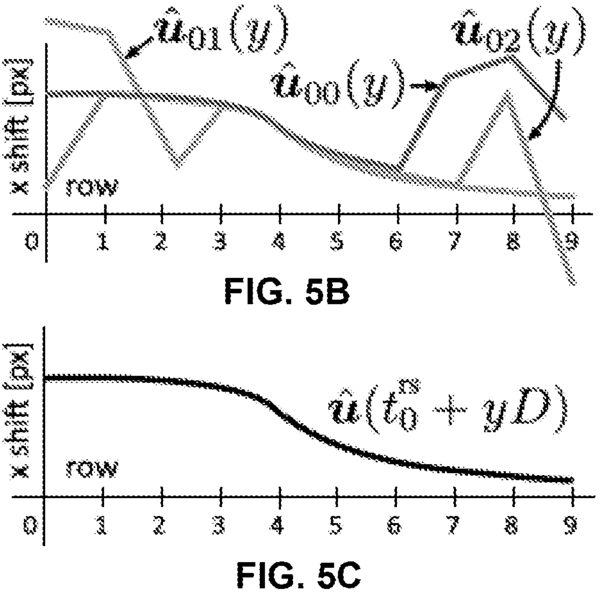
FIG. 5B
FIG. 5C

SYSTEM, METHOD, AND COMPUTER PROGRAM PRODUCT FOR OPTICAL VIBRATION SENSING

CROSS REFERENCE TO RELATED APPLICATIONS

This application is the United States national phase of International Patent Application No. PCT/US20222/053342, filed Dec. 19, 2022, and claims priority to U.S. Provisional Patent Application No. 63/291,005, filed Dec. 17, 2021, the disclosures of which are hereby incorporated by reference in their entireties.

GOVERNMENT RIGHTS

This invention was made with Government support under ECC-S2038612, IIS2107236, and U.S. Pat. No. 1,900,821 awarded by the National Science Foundation. The Government has certain rights in the invention.

BACKGROUND

1. Field

This disclosure relates generally to vibration sensing and, in non-limiting embodiments, to systems, methods, and computer program products for optical vibration sensing.

2. Technical Considerations

Vibrations are caused by various sources, including heartbeats, engines, music, speech, and ultrasonic devices. These vibrations exhibit various amplitudes (microns to meters) and frequencies (Hz to MHz). As such, measuring vibrations is an important tool in many engineering and scientific fields. However, optically sensing vibrations, particularly low-amplitude and high-frequency vibrations, is challenging. Existing solutions lack range and fidelity.

Indirect damped vibrations caused by remote sources (e.g., such as a speaker vibrating an object) can be even more subtle and difficult to measure with microphones or other existing solutions. Additionally, these challenges are even harder to overcome when the vibrating surface is a distance away from the imaging system and/or is in motion (e.g., the natural movements of a musician playing a handheld instrument, such as a guitar).

In contrast to passive approaches, existing speckle-based approaches to optically monitoring vibrations illuminate a vibrating surface with light and image the resulting speckle by focusing in between the surface and the sensor. A small tilt of the vibrating surface may result in a shift of the speckle. However, such existing approaches use high-speed two-dimensional cameras that limit the range of sampling frequencies and/or video spatial resolution.

SUMMARY

According to non-limiting embodiments or aspects, provided is a system comprising: a first visual sensor; a second visual sensor; and at least one processor in communication with the first visual sensor and the second visual sensor, the at least one processor configured to: capture at least one first image comprising at least one light on at least one object with the first visual sensor; capture at least one second image comprising the at least one light on the at least one object with the second visual sensor; and determine a vibration of the at least one object based on the at least one light captured in the at least one first image and the at least one second image.

In non-limiting embodiments or aspects, the system further comprises relay optics configured to split a captured image plane as input to the first visual sensor and the second visual sensor. In non-limiting embodiments or aspects, the first visual sensor comprises a rolling-shutter camera, and the second visual sensor comprises a global-shutter camera. In non-limiting embodiments or aspects, the system further comprises; a cylindrical lens arranged in a field-of-view of the first visual sensor and the second visual sensor, the cylindrical lens configured to expand the at least one light across a vertical plane of the field-of-view. In non-limiting embodiments or aspects, the first visual sensor comprises a line camera, and the second visual sensor comprises a global-shutter camera. In non-limiting embodiments or aspects, the at least one processor is configured to: track a motion of the at least one light with the second visual sensor; and determine at least one high-frequency two-dimensional shift of the at least one light based on tracking the at least one light, wherein determining the vibration of the at least one object is based on the at least one high-frequency two-dimensional shift.

In non-limiting embodiments or aspects, the at least one light comprises a plurality of simultaneous light emissions. In non-limiting embodiments or aspects, the system further comprises: at least one membrane arranged a distance from at least one light-emitting device, the first visual sensor, and the second visual sensor, the at least one object comprising the at least one membrane. In non-limiting embodiments or aspects, the at least one membrane comprises a plurality of membranes arranged in an environment, further comprising at least one optical device configured to emit the at least one light as a first plurality of lights on at least a first subset of membranes of the plurality of membranes in a first configuration and as a second plurality of lights on at least a second subset of membranes of the plurality of membranes in a second configuration. In non-limiting embodiments or aspects, the at least one processor is further configured to: recover at least one soundwave based on the vibration of the at least one object; and at least one of record and playback the at least one soundwave.

According to non-limiting embodiments or aspects, provided is a method comprising: capturing at least one first image comprising at least one light on at least one object with a first visual sensor; capturing at least one second image comprising the at least one light with a second visual sensor; and determining a vibration of the at least one object based on the at least one light captured in the at least one first image and the at least one second image.

In non-limiting embodiments or aspects, the method further comprises: splitting a captured image plane as input to the first visual sensor and the second visual sensor using relay optics. In non-limiting embodiments or aspects, the first visual sensor comprises a rolling-shutter camera, and the second visual sensor comprises a global-shutter camera. In non-limiting embodiments or aspects, the method further comprises: arranging a cylindrical lens in a field-of-view of at least one of the first visual sensor and the second visual sensor, the cylindrical lens configured to expand the at least one light across a vertical plane of the field-of-view. In non-limiting embodiments or aspects, the first visual sensor comprises a line camera, and the second visual sensor comprises a global-shutter camera. In non-limiting embodiments or aspects, the method further comprises: tracking a motion of the at least one light with the first visual sensor;

and determining at least one high-frequency two-dimensional shift of the at least one object based on tracking the motion, wherein determining the vibration of the at least one object is based on the at least one high-frequency two-dimensional shift.

In non-limiting embodiments or aspects, the at least one light comprises a plurality of simultaneous light emissions. In non-limiting embodiments or aspects, the at least one object comprises at least one membrane, the method further comprising; arranging the at least one membrane a distance from at least one light-emitting device. In non-limiting embodiments or aspects, the at least one membrane comprises a plurality of membranes, the method further comprises: controlling at least one optical device to emit the at least one light as a first plurality of lights on at least a first subset of membranes of the plurality of membranes in a first configuration and as a second plurality of lights on at least a second subset of membranes of the plurality of membranes in a second configuration. In non-limiting embodiments or aspects, the method further comprises: recovering at least one soundwave based on the vibration of the at least one object; and at least one of recording and playing back the at least one soundwave.

According to non-limiting embodiments or aspects, provided is a computer program product comprising at least one non-transitory computer-readable medium including program instructions that, when executed by at least one processor, cause the at least one processor to: capture at least one first image comprising at least one light on at least one object with a first visual sensor; capture at least one second image comprising the at least one light with a second visual sensor; and determine a vibration of the at least one object based on the at least one light captured in the at least one first image and the at least one second image.

According to non-limiting embodiments or aspects, provided is a system comprising: at least one visual sensor; a cylindrical lens arranged in a field-of-view of the at least one visual sensor; and at least one processor in communication with the at least one visual sensor, the at least one processor configured to: capture a plurality of images comprising at least one light on at least one object with the at least one visual sensor, the at least one light expanded along a vertical plane of each image of the plurality of images by the cylindrical lens; and determine a vibration of the at least one object based on the at least one light captured in the plurality of images.

According to non-limiting embodiments or aspects, provided is a method comprising: capturing a first plurality of images comprising at least one light with a first visual sensor, the at least one light expanded along a vertical plane of each image of the first plurality of images by a cylindrical lens; capturing a second plurality of images comprising the at least one light with a second visual sensor, the at least one light expanded along a vertical plane of each image of the second plurality of images by a cylindrical lens; and determining a vibration of at least one object based on the at least one light captured in the first plurality of images and the second plurality of images.

Further non-limiting embodiments are recited in the following clauses:

Clause 1: A system comprising: a first visual sensor; a second visual sensor; and at least one processor in communication with the first visual sensor and the second visual sensor, the at least one processor configured to: capture at least one first image comprising at least one light on at least one object with the first visual sensor; capture at least one second image comprising the at least one light on the at least one object with the second visual sensor; and determine a vibration of the at least one object based on the at least one light captured in the at least one first image and the at least one second image.

Clause 2: The system of clause 1, further comprising relay optics configured to split a captured image plane as input to the first visual sensor and the second visual sensor.

Clause 3: The system of any of clauses 1-2, wherein the first visual sensor comprises a rolling-shutter camera, and wherein the second visual sensor comprises a global-shutter camera.

Clause 4: The system of any of clauses 1-3, further comprising; a cylindrical lens arranged in a field-of-view of the first visual sensor and the second visual sensor, the cylindrical lens configured to expand the at least one light across a vertical plane of the field-of-view.

Clause 5: The system of any of clauses 1-4, wherein the first visual sensor comprises a line camera, and wherein the second visual sensor comprises a global-shutter camera.

Clause 6: The system of any of clauses 1-5, wherein the at least one processor is configured to: track a motion of the at least one light with the second visual sensor; and determine at least one high-frequency two-dimensional shift of the at least one light based on tracking the at least one light, wherein determining the vibration of the at least one object is based on the at least one high-frequency two-dimensional shift.

Clause 7: The system of any of clauses 1-6, wherein the at least one light comprises a plurality of simultaneous light emissions.

Clause 8: The system of any of clauses 1-7, further comprising: at least one membrane arranged a distance from at least one light-emitting device, the first visual sensor, and the second visual sensor, the at least one object comprising the at least one membrane.

Clause 9: The system of any of clauses 1-8, wherein the at least one membrane comprises a plurality of membranes arranged in an environment, further comprising at least one optical device configured to emit the at least one light as a first plurality of lights on at least a first subset of membranes of the plurality of membranes in a first configuration and as a second plurality of lights on at least a second subset of membranes of the plurality of membranes in a second configuration.

Clause 10: The system of any of clauses 1-9, wherein the at least one processor is further configured to: recover at least one soundwave based on the vibration of the at least one object; and at least one of record and playback the at least one soundwave.

Clause 11: A method comprising: capturing at least one first image comprising at least one light on at least one object with a first visual sensor; capturing at least one second image comprising the at least one light with a second visual sensor; and determining a vibration of the at least one object based on the at least one light captured in the at least one first image and the at least one second image.

Clause 12: The method of clause 11, further comprising: splitting a captured image plane as input to the first visual sensor and the second visual sensor using relay optics.

Clause 13: The method of any of clauses 11-12, wherein the first visual sensor comprises a rolling-shutter camera, and wherein the second visual sensor comprises a global-shutter camera.

Clause 14: The method of any of clauses 10-13, further comprising: arranging a cylindrical lens in a field-of-view of at least one of the first visual sensor and the second visual sensor, the cylindrical lens configured to expand the at least one light across a vertical plane of the field-of-view.

Clause 15: The method of any of clauses 10-14, wherein the first visual sensor comprises a line camera, and wherein the second visual sensor comprises a global-shutter camera.

Clause 16: The method of any of clauses 10-15, further comprising: tracking a motion of the at least one light with the first visual sensor; and determining at least one high-frequency two-dimensional shift of the at least one object based on tracking the motion, wherein determining the vibration of the at least one object is based on the at least one high-frequency two-dimensional shift.

Clause 17: The method of any of clauses 10-16, wherein the at least one light comprises a plurality of simultaneous light emissions.

Clause 18: The method of any of clauses 10-17, wherein the at least one object comprises at least one membrane, further comprising; arranging the at least one membrane a distance from at least one light-emitting device.

Clause 19: The method of any of clauses 10-18, wherein the at least one membrane comprises a plurality of membranes, further comprising: controlling at least one optical device to emit the at least one light as a first plurality of lights on at least a first subset of membranes of the plurality of membranes in a first configuration and as a second plurality of lights on at least a second subset of membranes of the plurality of membranes in a second configuration.

Clause 20: The method of any of clauses 10-19, further comprising: recovering at least one soundwave based on the vibration of the at least one object; and at least one of recording and playing back the at least one soundwave.

Clause 21: A computer program product comprising at least one non-transitory computer-readable medium including program instructions that, when executed by at least one processor, cause the at least one processor to: capture at least one first image comprising at least one light on at least one object with a first visual sensor; capture at least one second image comprising the at least one light with a second visual sensor; and determine a vibration of the at least one object based on the at least one light captured in the at least one first image and the at least one second image.

Clause 22: A system comprising: at least one visual sensor; a cylindrical lens arranged in a field-of-view of the at least one visual sensor; and at least one processor in communication with the at least one visual sensor, the at least one processor configured to: capture a plurality of images comprising at least one light on at least one object with the at least one visual sensor, the at least one light expanded along a vertical plane of each image of the plurality of images by the cylindrical lens; and determine a vibration of the at least one object based on the at least one light captured in the plurality of images.

Clause 23: A method comprising: capturing a first plurality of images comprising at least one light with a first visual sensor, the at least one light expanded along a vertical plane of each image of the first plurality of images by a cylindrical lens; capturing a second plurality of images comprising the at least one light with a second visual sensor, the at least one light expanded along a vertical plane of each image of the second plurality of images by a cylindrical lens; and determining a vibration of at least one object based on the at least one light captured in the first plurality of images and the second plurality of images.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying drawings, in which:

FIG. 5A illustrates captured image frames for two visual sensors used in a system for optical vibration sensing according to non-limiting embodiments or aspects;

FIG. 5B illustrates an x-axis shift in a system for optical vibration sensing according to non-limiting embodiments or aspects;

FIG. 5C illustrates a merged recovery of image frames in a system for optical vibration sensing according to non-limiting embodiments or aspects.

DETAILED DESCRIPTION

It is to be understood that the embodiments may assume various alternative variations and step sequences, except where expressly specified to the contrary. It is also to be understood that the specific devices and processes described in the following specification are simply exemplary embodiments or aspects of the disclosure. Hence, specific dimensions and other physical characteristics related to the embodiments or aspects disclosed herein are not to be considered as limiting. No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Also, as used herein, the terms "has," "have," "having," or the like are intended to be open-ended terms. Further, the phrase "based on" is intended to mean "based at least partially on" unless explicitly stated otherwise.

As used herein, the term "computing device" may refer to one or more electronic devices configured to process data, such as one or more processors (e.g., CPU, GPU, microprocessor, controller, and/or the like). A computing device may, in some examples, include the necessary components to receive, process, and output data, such as a processor, a display, a memory, an input device, a network interface, and/or the like. A computing device may be a mobile device.

A computing device may also be a desktop computer or other form of non-mobile computer.

Figure 1:
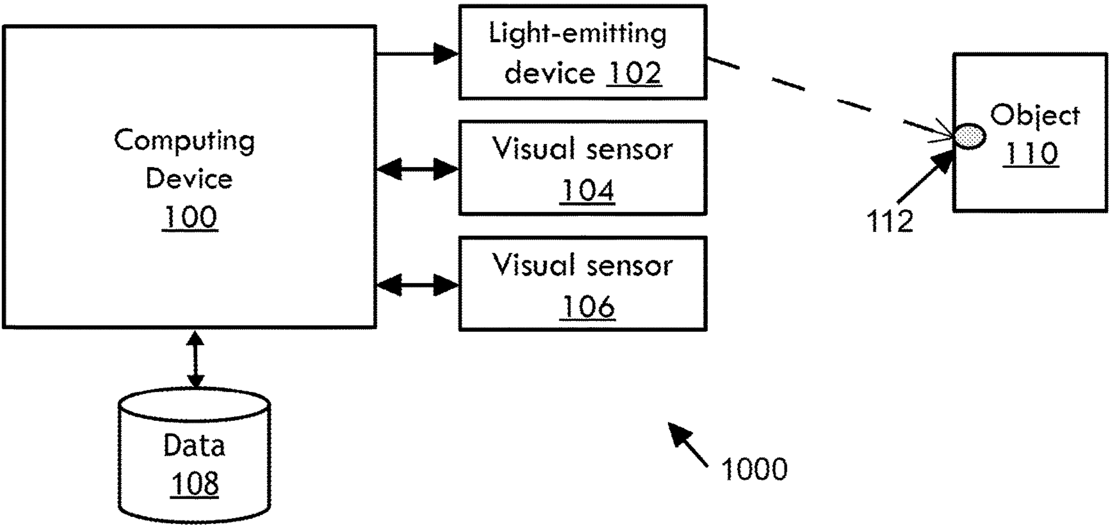
FIG. 1 illustrates a system for optical vibration sensing according to non-limiting embodiments or aspects.

Referring now to FIG. 1, a system 1000 for optical vibration sensing is shown according to some non-limiting embodiments. The system 1000 enables optically capturing vibrations of objects, including vibrations having low amplitude and high frequencies that may not be fully captured by microphones or other systems, even though the object may move (e.g., drift) during vibration. A computing device 100 is in communication with at least one light-emitting device 102, such as a laser, projector, and/or any other like device that outputs a light 112 on an object 110 at a distance from the light-emitting device 102.

In non-limiting embodiments, a beam of coherent light (e.g., such as a laser) output by the light-emitting device 102 creates a spot (e.g., light 112) on the surface of an object 110. In non-limiting embodiments, a 532 nm 4.5 mW laser in a coaxial configuration with a beam-splitter may be used, although it will be appreciated that various types of light-emitting devices may be used. Although a single light-emitting device 102 and light 112 are shown in FIG. 1, it will be appreciated that multiple lights may be emitted from a single light-emitting device 102 (e.g., using a beam-splitter, such as a Thorlabs PBSW-532R) and/or multiple light-emitting devices. The object 110 may include, for example, a wall surface, floor surface, instrument, membrane, speaker, and/or any other active object that is made to vibrate (e.g., an instrument, speaker, and/or the like) or passive object that vibrates indirectly based on sound waves in the environment. In some non-limiting embodiments, a reflective material (e.g., retroreflective markers, such as tape or the like) may be placed on the object 110 to enhance the light efficiency (e.g., an amount of light reflected from each point). In some examples in which the object 110 has a lower reflectiveness, a higher-power laser may be used.

The system 1000 is shown as including a first visual sensor 104 and a second visual sensor 106. In non-limiting embodiments, the first visual sensor 104 may include a rolling-shutter camera arranged to capture a plurality of images in a field-of-view that includes the light 112 projected on the object 110. A rolling-shutter camera may capture different rows of an image array of the field-of-view at different instances in time as exposed. In non-limiting embodiments, the first visual sensor 104 may be a line sensor (e.g., line camera). In non-limiting embodiments, the second visual sensor 106 may include a global-shutter camera. A global-shutter camera may capture all rows of an image array of the field-of-view at once. In non-limiting embodiments, the first visual sensor and second visual sensor may be low-speed cameras (e.g., 60 Hz and 134 Hz, respectively), although it will be appreciated that a variety of different low-speed and high-speed cameras may be used.

In non-limiting embodiments, the visual sensors 104, 106 may capture the light 112 by focusing on a plane that is a distance away from the surface of the object 110 (e.g., between the visual sensors 104, 106 and the object 110). At each focus-plane point, the electric field is the sum of contributions from multiple illuminated object surface points. In non-limiting embodiments, the light 112 appears with a microscopic "roughness" on the object 110 based on the texture and/or diffusiveness of the object 110. This creates a random spatial interference pattern referred to as a "speckle," and a squared amplitude of the speckle at the focus plane is imaged by the visual sensors 104, 106.

Still referring to FIG. 1, the image data captured by the first visual sensor 104 and second visual sensor 106 may be processed by the computing device 100 to determine a vibration of the object 110. For example, the second visual sensor (e.g., a global-shutter camera in some non-limiting embodiments) may be used to track the at least one light 112 on the object 110 to provide supplementary image data that can be used to recover aspects of the plurality of images captured by the first visual sensor (e.g., a rolling-shutter camera in some non-limiting embodiments). In non-limiting embodiments, tracking the at least one light with the second visual sensor 106 may enable the computing device 100 to determine at least one high-frequency two-dimensional shift of the light that is not captured in the images from the first visual sensor 104. Images may be stored temporarily or permanently in a data storage device 108.

In non-limiting embodiments, the light 112 projected on the object 110 may be a speckle of light based on the expansion of one or more light beams over the distance between the light-emitting device 102 and the object 110. The speckle of light 112 on the object may provide multiple different distinct points of light and/or gradients of light to simultaneously monitor with the visual sensors 104, 106. In some non-limiting embodiments, one or more lenses may be arranged between the object 110 and one or more of the visual sensors 104, 106. For example, in non-limiting embodiments, a cylindrical lens may be arranged in the field-of-view of the visual sensor 104 and/or visual sensor 106. A cylindrical lens may cause the light 112 to be expanded across a vertical plane of the field-of-view.

Although the non-limiting embodiment shown in FIG. 1 includes two visual sensors 104, 106, it will be appreciated that non-limiting embodiments may be implemented with a single visual sensor 102. For example, a cylindrical lens may be used to expand the light 112 that is captured by the visual sensor 102 such that the computing device 100 has sufficient image data to calculate a vibration of the object 110.

In non-limiting embodiments, multiple lights spaced apart may be simultaneously projected onto one or more objects. For example, multiple lights may be projected on the object 110, one or more lights 112 may be projected on the object 110, and other lights may be projected on other objects in the same environment (e.g., in the same room, region, or the like). This may be performed by one or more light-emitting devices 102. The visual sensors 104, 106 may simultaneously capture multiple lights in a field-of-view and process the captured images in parallel. In some non-limiting embodiments, an array of light projections may be used.

In some non-limiting embodiments, one or more objects designed to capture vibrations, such as one or more membranes, may be placed in an area to capture a wide range of vibrations. For example, in some non-limiting embodiments, one or more diaphragms may be arranged in an environment to capture vibrations. The diaphragms may be constructed from passive membranes having known and/or configurable properties. In some examples, an array of membranes may include one or more floating membranes (e.g., membranes that are detached from a fixed structural component of an environment). In some examples, an array (e.g., a 5×4 array or any other dimension) of different membranes and/or regions of a single membrane may be arranged in an environment.

In some non-limiting embodiments, the system 1000 may include an optical device, such as an optomechanical and/or optoelectronic device (e.g., one or more galvanometers in some non-limiting embodiments) to steer the light-emitting device (e.g., laser and/or a beam-splitter being used in conjunction with the laser in some non-limiting embodiments) to different membranes in different configurations. The different membranes may, in some examples, have different shapes and/or materials to provide a varying sound-capturing function. One or more membranes (e.g., at least a subset of membranes) may correspond to different functions including, for example, a long-distance microphone configuration, a short-distance microphone configuration, a particular microphone array (e.g., combination of membranes), and/or the like. In non-limiting embodiments, different configurations may include a single light on a single membrane, multiple lights on a single membrane, multiple lights on multiple membranes such that a single light is on each membrane of the group, multiple lights on multiple membranes such that multiple lights are on each membrane of the group, and/or any other combination of membranes and numbers of lights. In non-limiting embodiments, the computing device 100 may be used to control the optical device to switch to different configurations based on user input and/or dynamically.

Figure 2:
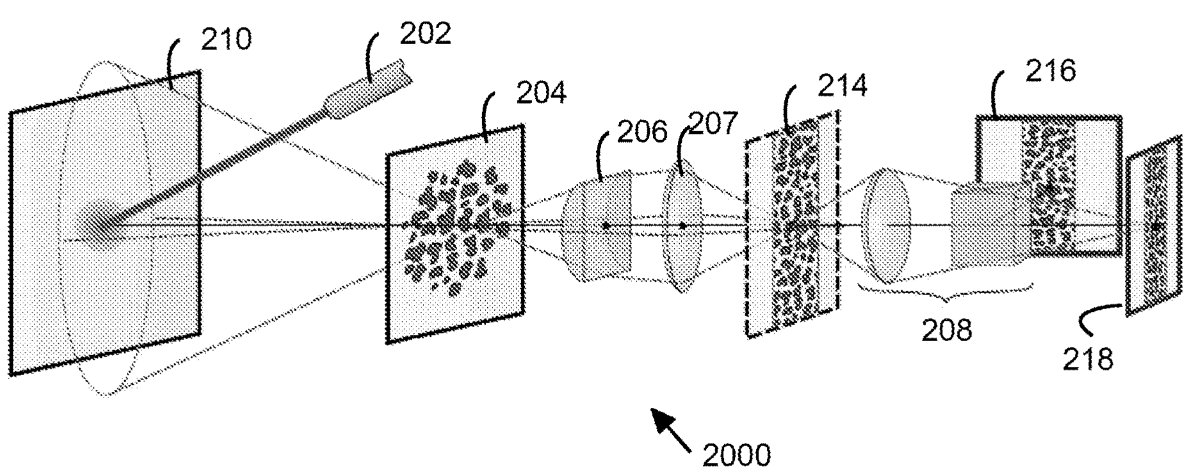
FIG. 2 illustrates a system for optical vibration sensing according to non-limiting embodiments or aspects.

Referring now to FIG. 2, a system 2000 for optical vibration sensing is shown according to some non-limiting embodiments. A light-emitting device 202 may be as shown and described in FIG. 1 with respect to the light-emitting device 102. After emitting a light from the light-emitting device 202, two visual sensors 216, 218 capture a plurality of images of the light. Between the visual sensors 216, 218 is a cylindrical lens 206 that transforms a focus plane 204 of the field-of-view of the sensors 216, 218 to expand the light speckle across a vertical plane of the field-of-view (e.g., shown in an image plane 214). Other optical devices may be included in the system 2000, including but not limited to an objective lens 207 (e.g., behind the cylindrical lens 206 in the field-of-vision) and relay optics 208 (e.g., such as additional lenses for splitting the image plane into two images to be simultaneously captured by two the sensors 216, 218, such as a beam splitter). In the example shown, the visual sensor 216 may be a global-shutter camera and the sensor 218 may be a rolling-shutter camera, both of which collect a sequence of image frames as video.

In non-limiting embodiments, the cylindrical lens 206 may cover the entire vertical field-of-view of the rolling-shutter sensor 218 so that multiple locations of the light speckle may be monitored simultaneously. This may result in a speckle column that reaches all of the rolling-shutter sensor rows, while occupying only a fraction of the sensor image columns (e.g., 150 pixels or the like). Therefore, unlike defocusing a standard spherical lens or using a bare sensor, the arrangement shown in FIG. 2 is able to sample multiple surface points at once. Each point yields a separate speckle column that is sampled using all rolling-shutter rows.

In some examples, expanding the light speckle across a vertical plane may result in the light speckle being distorted by the rolling-shutter sensor 218 with unknown shifts in each image row. This distortion may make it difficult to fully capture the two-dimensional vibrations of an object 210 in some implementations. In non-limiting embodiments, this distortion may be addressed with the global-shutter sensor 216. By co-locating the global-shutter sensor 216 and the rolling-shutter sensor 218, the image data captured by the global-shutter sensor 216 may be used to compensate for the unknown shifts in the image data captured by the rolling-shutter sensor 218. Tracking the light speckle with the global-shutter sensor 216 provides a reference for recovering high-frequency two-dimensional shifts in one or more image rows of the capture plane of the rolling-shutter sensor 218. An algorithm may be applied to the captured image data to output the macro-motion or drift of the light speckle in addition to the high-frequency vibrations of the light speckle.

Figure 3:
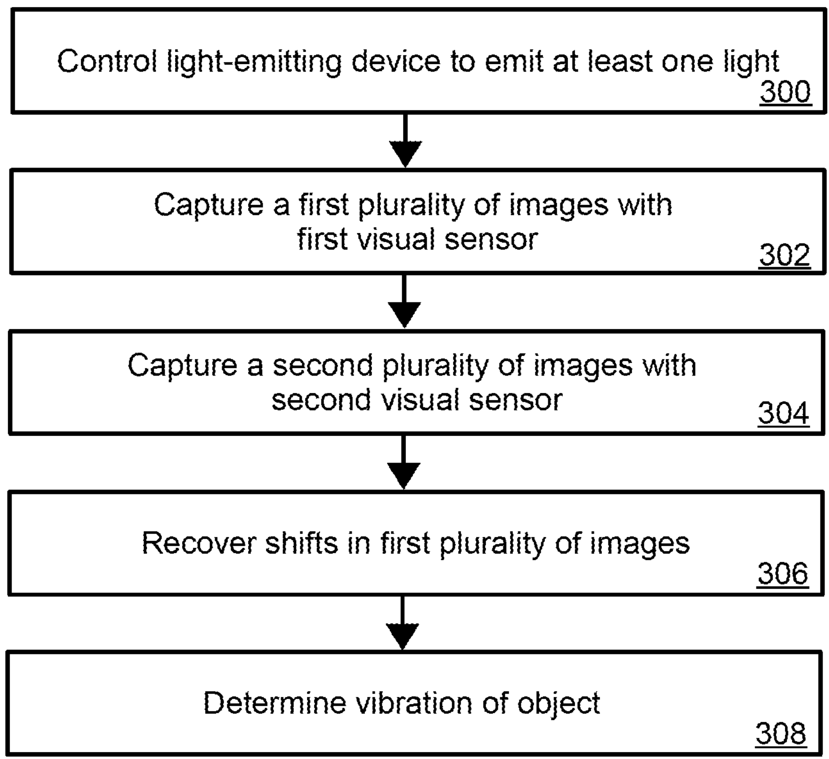
FIG. 3 illustrates a flow diagram for a method of optical vibration sensing according to non-limiting embodiments or aspects.

Referring now to FIG. 3, shown is a flow diagram for a method of optical vibration sensing according to non-limiting embodiments or aspects. The steps shown in FIG. 3 are for example purposes only and additional, fewer, and/or a different order of steps may be performed in non-limiting embodiments. At a first step 300, at least one light is emitted (e.g., projected) on at least one object. For example, one or more lasers may be pointed at an object. The light may form a speckle on the object based on a distance between the light-emitting device and the object. At step 302, a first plurality of images (e.g., a video including a sequence of separate image frames) are captured with a first visual sensor. For example, a rolling-shutter camera may be directed toward the object such that the light emitted at step 300 is within the field-of-view of the rolling-shutter camera. The captured images may be stored in memory, such as a cache.

At step 304, a second plurality of images are captured with a second visual sensor. For example, a global-shutter camera may be directed toward the object such that the light emitted at step 300 is within the field-of-view of the global-shutter camera. The captured images may be stored in memory, such as a cache. The second visual sensor may be co-located with the first visual sensor and may be configured to capture the second plurality of images simultaneously or substantially simultaneously with the capture of the first plurality of images with the first visual sensor in step 302. In non-limiting embodiments, one or more optical devices may be arranged between the object and the first visual sensor and second visual sensor. For example, a cylindrical lens may be arranged to expand the light speckle across a vertical plane of the field-of-view of the visual sensors. In some non-limiting embodiments, relay optics may be used to split the image to both first and second visual sensors, thereby directing the same input to both sensors.

In non-limiting embodiments in which both visual sensors have the same size/resolution and optical alignment, an identical image is formed on both sensors. In other non-limiting embodiments in which the alignment and/or resolution differs, a mapping between the visual sensors may be determined and calibrated. Calibration may include capturing a static speckle scene, detecting and matching feature points in both frames (e.g., frames from both rolling-shutter and global-shutter sensors), and computing the parameters of the desired mapping model. In non-limiting embodiments, a third-degree smooth bi-variate spline interpolation may be used to compute the mapping. It will be appreciated that other mapping techniques may be used. The mapping may be computed locally per each cropped laser-point speckle column, as an example. An exposure time (e.g., 18 seconds or the like) is set equally in both cameras. A region-of-interest (ROI) may be determined as a reduction (e.g., by pixels) of the total field-of-view. In some examples, the ROI may be adjusted such that the horizontal field-of-view of the global-shutter sensor is slightly larger than that of the rolling-shutter sensor (e.g., by 40 pixels or the like) to prevent the first and last rows from shifting outside the field-of-view captured by the global-shutter sensor. In non-limiting embodiments, hyper-parameters may be set as: P=15 reference frames, and A=(1,000,100) for the coarse and fine levels in Equation 11 (shown below) which yields a run time of 6 seconds per frame.

In non-limiting embodiments, the calibration process includes three stages. As a first stage, a pair of frames of a static object are captured and stored. The system extracts feature points in both frames using a SIFT descriptor. Using the extracted feature points, the system estimates an initial (e.g., rough) homography transform between the full sensor frames. As an example, the values of $$I_{RS}^0 \text{ and } I_{GS}^0$$

denote the stored calibration frames. The initial homography mapping may be insufficiently accurate since it cannot encapsulate non-projective lens distortions. However, it may be used to automatically find and crop roughly the same image domain in the global-shutter (e.g., reference) frames. During vibration sensing, the visual sensors may be pointed at the object or objects of interest to record the simultaneous videos. The rolling-shutter video $I_{RS}$ is cropped on the speckle column of the point to recover, yielding $\bar{I}_{RS}$.

At a second stage, the same crop is applied to $$\bar{I}_{RS}^0$$

yielding $$\bar{I}_{RS}^0.$$

The initial homography is then used to automatically find and crop the same image domain in the global-shutter frames for the calibration frame and the captured vibration video, yielding $$\bar{I}_{RS}^0 \text{ and } \bar{I}_{GS},$$

respectively. At a third stage, a more accurate mapping may be computed by repeating the feature extraction process on the cropped $$\bar{I}_{RS}^0 \text{ and } \bar{I}_{GS}^0,$$

an using the extracted points to fit a third-degree smooth bivariate spline interpolation between the frames. The resulting mapping may then be applied to $I_{GS}$ to yield $\bar{I}_{GS}$. The first stage may be performed once while the second and third stages may be repeated before the recovery of each unique speckle column to yield an accurate local mapping. In some examples, imperfections in the resulting mapping may still yield a small sub-pixel bias to the x- and y-shifts, respectively, which may be removed in non-limiting embodiments by averaging the signal of a few static frames (where the object is static) and subtracting the computed x- and y-axis biases, per frame, from all future measurements.

In the following example equations, I(x,t) refers to the image intensity in both sensors, where x≡(x,y) is the pixel coordinates and t is the image trigger time (e.g., instance of capture). For illustration purposes, the equations below use both vector x, and the explicit row coordinates y of x. In these examples, I(x,t) is a continuous function of time, yielding the image (in grayscale units) that would form at trigger time t. $I_{GS}$(x,t), and $I_{RS}$(x,t) denote the global- and rolling-shutter video frames captured at time t, respectively. In the global-shutter sensor, all sensor pixels collect scene light simultaneously during the exposure duration such that:

$$I_{GS}(x, t) = I(x, t) \quad \text{(Equation 1)}$$

Image frames captured by the global-shutter sensor may be referred to herein as reference frames. In a rolling-shutter sensor, the individual image rows are exposed one by one in sequence with a constant delay D. Thus, the rolling-shutter frame at time t is represented by:

$$I_{RS}(x, t) = I(x, t + yD) \quad \text{(Equation 2)}$$

Equations 1 and 2 illustrate the spatio-temporal relationship between the rolling-shutter and global-shutter sensor images, as shown:

$$I_{RS}(x, t) = I_{GS}(x, t + yD),\ y \in \{0, 1, \ldots, H-1\} \quad \text{(Equation 3)}$$

Figure 4:
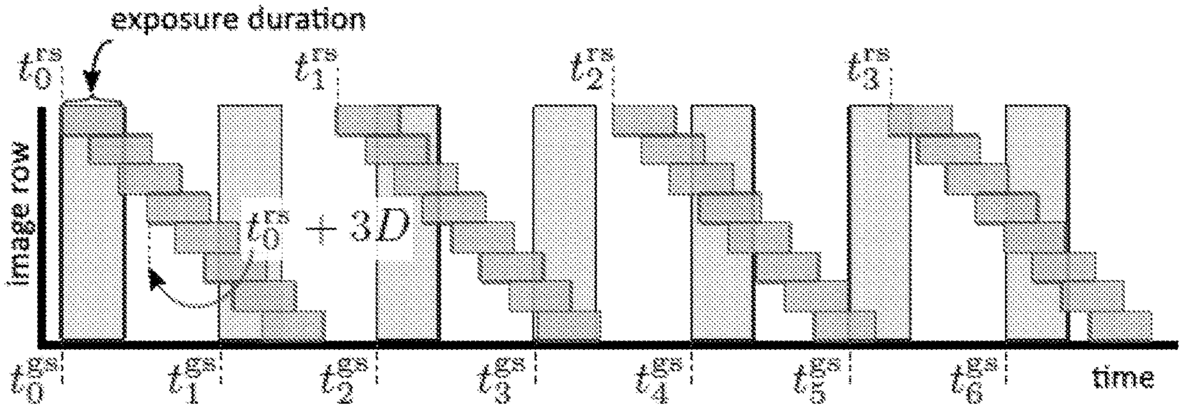
FIG. 4 illustrates image capture timing for two visual sensors used in a system for optical vibration sensing according to non-limiting embodiments or aspects.

In non-limiting embodiments, both cameras simultaneously start video capture at their individual frame rates. For example, the value $$t_k^{GS}$$

may denote the time stamps of K global-shutter reference frames, where k=0, 1 . . . K−1 is the frame index. This is shown in FIG. 4, which shows a chart of the timing for dual-shutter sensors capturing streams of images simultaneously. The rolling-shutter camera samples the scene (e.g., field-of-view) row-by-row with a high-frequency of 1/D, while the global-shutter camera samples the entire scene at once.

Similarly, the value $$t_n^{RS}$$

may denote the time stamps of N rolling-shutter frames, where n=0, 1 . . . N−1 is the frame index. For small tilts and shifts of the illuminated surface, the imaged speckle pattern may remain approximately constant, up to a two-dimensional image-domain shift represented as:

$$u(t) \equiv (u_{dx}(t), u_{dy}(t)) \quad \text{(Equation 4)}$$

In the above Equation 4, $u_{dx}(t)$ and $u_{dy}(t)$ are the x-axis and y-axis speckle pattern shifts in pixels, respectively. Without loss of generality, $$u\left(t_k^{GS}\right) = (0, 0).$$

Thus, any two reference frames with indices $k_1$ and $k_2$ are related by image translation:

$$I_{GS}\left(x, t_{k_1}^{gs}\right) = I_{GS}\left(x + u\left(t_{k_1}^{gs}\right) - u\left(t_{k_2}^{gs}\right), t_{k_2}^{gs}\right) \quad \text{(Equation 5)}$$

As shown, the absolute shift $$u\left(t_k^{GS}\right)$$

of any individual reference frame can be recovered by integrating all the relative image translations $$u(t_k^{gs}) - u(t_{k-1}^{gs}):$$

$$u(t_k^{gs}) = \sum_{i=1}^{k} (u(t_i^{gs}) - u(t_{i-1}^{gs})),\ \forall\, k > 0 \quad \text{(Equation 6)}$$

Combining Equations 3-5 provides:

$$I_{RS}(x, t_n^{rs}) = I_{GS}(x, t_n^{rs} + yD) == I_{GS}\,(x + u(t_n^{rs} + yD) - u(t_k^{gs}), t_k^{gs}) \quad \text{(Equation 7)}$$

The relative shift of every rolling-shutter row y in $$I_{RS}\left(x, t_n^{RS}\right)$$

with respect to the same row in $$I_{GS}\left(x, t_k^{GS}\right)$$

may be designated as:

$$\delta u_{nk}(y) \equiv u(t_n^{rs} + yD) - u(t_k^{gs}) \quad \text{(Equation 8)}$$

In Equation 8, the term $$u\left(r_k^{GS}\right)$$

is constant since all global-shutter frame rows are shifted together at time $$t_k^{GS}.$$

Rearranging Equation 8 yields a formula for the speckle image shifts starting at time $$t_n^{RS}$$

and ending at time $$t_n^{RS} + HD$$

as shown:

$$u(t_n^{rs} + yD) = \delta u_{nk}(y) + u(t_k^{gs}) \quad \text{(Equation 9)}$$

Equation 9 shows that, given any pair of rolling- and global-shutter frames, we can compute H samples of the global speckle shifts with a fine temporal resolution of D. To recover the samples using Equation 9, two pieces of information are used: the shift $$u\left(c_k^{GS}\right),$$

and $\delta u_{nk}(y)$. The shift $$u\left(r_k^{GS}\right)$$

may be computed using Equation 6.

With continued reference to FIG. 3, at step 306, speckle shifts (e.g., u(t)) captured by the rolling-shutter sensor may be recovered. In non-limiting embodiments, shift recovery may be performed using Equation 9. A single rolling-shutter frame, having index n, may yield H temporal measurements of u(t) at a sampling rate of 1/D. Given no delay between two consecutive rolling-shutter frames, capturing N consecutive frames may yield a recording of NHD seconds in duration.

In non-limiting embodiments, recovering $u(t^{rs}+yD)$ includes selecting a reference frame k. In non-limiting embodiments, any reference frame k may be used. In some examples, object macro-motion may yield little or no spatial overlap between the speckle patterns of $$I_{RS}\left(x, t_n^{RS}\right) \text{ and } I_{GS}\left(x, t_k^{GS}\right),$$

causing the estimation of $\delta u_{nk}(y)$ to fail. Therefore, in non-limiting embodiments, a reference frame is selected having a timestamp $$t_k^{GS}$$

that is close to $$t_n^{RS}.$$

In non-limiting embodiments, the captured images $I_{RS}$ and $I_{GS}$ may be cropped to the speckle column (e.g., caused in non-limiting embodiments in which a cylindrical lens is used) belonging to the point to be recovered along an x-axis and y-axis in two-dimensional space. The values $$\bar{I}_{RS}(x, t_n^{RS}) \text{ and } \bar{I}_{GS}(x, t_n^{GS})$$

may denote the resulting cropped image frames (e.g., videos). For explanation purposes, the value $\hat{u}_{nk}(y)$ may denote the recovered shifts resulting from using reference frame k as follows:

$$\hat{u}_{nk}(y) \equiv \delta\hat{u}_{nk}(y) + \hat{u}(t_k^{gs}) \quad \text{(Equation 10)}$$

In non-limiting embodiments, phase correlation may be used to compute the shifts between every pair of consecutive reference frames $$\bar{I}_{GS}(x, t_k^{GS}),$$

and Equation 6 may be applied to yield $$\hat{u}(t_k^{GS}) \forall\, k.$$

In non-limiting embodiments, V may be equal to $$\{vm\}_{M=0}^{M-1}$$

to denote a discrete set of M possible two-dimensional row shifts having some sub-pixel resolution and maximum span. The set of all row shifts for frame n may be defined as $U=\{\delta u_{nk}(y)\}\forall_y$, where $\delta u_{nk}(y) \in V$. The value U may then be recovered by minimizing the loss as shown:

$$E(\mathcal{U}) = \sum_y [1 - S_y(\delta u_{nk}(y))] + \lambda \sum_{y,y'} V_{y,y'}(\delta u_{nk}(y), \delta u_{nk}(y')) \quad \text{(Equation 11)}$$

In Equation 11, the data term $S_y(\delta u_{nk}(y))<=1$ quantifies the similarity of row y in $\bar{I}_{RS}$ to all M possible shifts of row y in $\bar{I}_{GS}$. The term $V_{y,y'}(\delta u_{nk}(y),\delta u_{nk}(y'))$ enforces smoothness by providing a penalty when neighboring rows y, y' have differing shifts. Vy,y' may be set to equal $$\|\delta unk(y) - \delta unk(y)\|_2^2.$$

The value $S_y(v_m)$ may be computed using the zero-normalized cross-correlation operator ZNCC(.,.):

$$S_y(v_m) = ZNCC\left(\bar{I}_{RS}(x, t_n^{rs}), \bar{I}_{GS}(x + v_m, t_k^{gs})\right) \quad \text{(Equation 12)}$$

The value û may be recovered as follows:

$$\hat{\mathcal{U}} = \underset{\mathcal{U}}{\operatorname{argmin}}\,(E(\mathcal{U})) \quad \text{(Equation 13)}$$

Solving directly for large M is computationally resource intensive because it involves computing correlations with a large dictionary of possible shifts. Thus, in non-limiting embodiments an efficient coarse-to-fine approach for solving Equation 13, which computes correlations in the Fourier domain, may be used and implemented.

In the example above, shift recovery for frame n is described with respect to relying on a single reference frame. In non-limiting embodiments, multiple reference frames may be used for recovery. FIG. 5A shows an example of image frames of a field-of-view 500 being captured according to non-limiting embodiments. In the example shown in FIG. 5A, the motion of the light speckle may follow arrow 502. Three global-shutter frames (e.g., reference frames) are shown as the dashed-line rectangles k=0, k=1, k=2. A single rolling-shutter frame is shown having ten individual rows ($r_0$ through $r_9$). As shown in this example, none of the reference frames contain overlap with all of the rows of the rolling-shutter frame. As a result, more than a single reference frame is used to recover the shifts for all of the rows.

FIG. 5B illustrates an x-axis shift recovered separately using each of the reference frames (e.g., image frames captured with a global-shutter sensor) according to non-limiting embodiments. In this example, rolling-shutter image frames that do not include overlap or substantial overlap with the reference frames yield noisy results. Due to large amplitude vibrations or large object motions, a single reference may not be enough to recover the relative translations for all H rows, yielding partial recovery of $u(t^{rs}+yD)$. Therefore, in non-limiting embodiments, P>=1 reference frames are used to estimate $u(t^{rs}+yD)$ as follows.

The value of $R_n=\{k_0, k_1, \ldots, k_{P-1}\}$ may denote the set of indices for reference frames chosen to recover frame n. For scenes having large low-frequency motions (e.g., hand-held instruments or the like), $R_n$ consists of the P temporally closest frames to $$t_n^{RS}.$$

For mostly static scenes, the value of $R_n$ may be constructed using frames close to $$t_n^{RS}$$

that cover the largest two-dimensional speckle domain. First, shifts $u\hat{}_{nk}(y)$ are computed for every reference frame k∈R. Then, the shifts from all reference frames are merged using a weighted average:

$$\hat{u}(t_n^{rs} + yD) = \sum_{k \in R_n} W_{nk}(y)\hat{u}_{nk}(y) \quad \text{(Equation 14)}$$

Each of the per-row weights $W_{nk}(y)$ of the reference frame are computed using the similarity measures of the recovered shifts:

$$\hat{S}_{nk}(y) \equiv S_y^k(\hat{u}_{nk}(y)) \quad \text{(Equation 15)}$$

In the above Equation 15, the superscript k is added to $S_y$ to denote the similarity function computed for reference frame k.

$$W_{nk}(y) = \exp\left(\gamma \hat{S}_{nk}(y)\right) \Big/ \sum_{k \in R_n} \exp\left(\gamma \hat{S}_{nk}(y)\right) \quad \text{(Equation 16)}$$

In the above Equation 16, γ=50. Equations 14-16 allow for each row to take its recovered shift from the reference frames that exhibit good similarity. When most reference frames contribute good recoveries, Equation 14 has the additional benefit of reducing the noise of the recovered signal by averaging. FIG. 5C shows a merged recovery of signal portions from multiple separate recoveries.

In non-limiting embodiments, a two-step coarse-to-fine approach for recovering $\delta u_{nk}(y)$ to reduce the time taken to calculate Equations 11-13. In the coarse level, the shifts are recovered sequentially. First, the y-axis shifts are recovered followed by the x-axis shifts. The rows of $\bar{I}_{RS}$ and $\bar{I}_{GS}$ may be normalized, yielding $$\bar{I}_{RS}^{norm} \text{ and } \bar{I}_{RS}^{norm},$$

respectively. The row-wise normalization includes subtracting the mean of each row and dividing each row by a standard deviation for the row. Then a row-wise Fast Fourier Transform is applied on the rows of $$\bar{I}_{RS}^{norm} \text{ and } \bar{I}_{GS}^{norm}$$

to yield $$\bar{I}_{RS}^{F} \text{ and } \bar{I}_{GS}^{F},$$

respectively.

As an example, $$y = \{y1\}_{L=1}^{L=0}$$

denotes a set of possible y-axis shifts having some maximum span, and a step size of one pixel, e.g., Y={−40, −39, . . . , 40}. Next, the correlation is computed for the normalized rows in the Fourier domain for each shift in Y:

$$O_y(x, y_l) = \frac{1}{R} \left| \mathcal{F}^{-1}\left(\bar{I}_{RS}^{\mathcal{F}}(x, t_n^{rs}) \odot \bar{I}_{GS}^{\mathcal{F}}(x + (0, y_l), t_k^{gs})^{conj}\right)\right.$$

In the above, $F^{-1}(\cdot)$ is the inverse FFT operator, R is the width of the speckle column in pixels, and the superscript conj denotes a complex conjugate. As shown, for every vertical shift $y_l$, the above equation yields a vector of normalized correlations for R horizontal shifts in the range {−R/2, . . . , R/2}. Therefore, function $O_y(x,y_l)$ simultaneously provides information on both x- and y-axis correlations between the rolling- and global-shutter frames. For the correct vertical shift $y_t$, the peak correlation value across all x-axis shifts in $O_y(x,y_t)$ may be the highest with respect to the other $y_r$. Moreover, once the correct vertical shift $y_t$ is found, the location of the highest correlation peak directly corresponds to the recovered x-axis shifts. The optical vertical y-axis shift may be computed as:

$$S_y^{dy}(y_l) = \max_x O_y(x, y_l)$$

The above denotes the y-axis similarity measure.

$$U^{dy} = \{\delta \hat{u}_{dy}^c(y)\} \forall_y$$

may represent the set of y-axis shifts for all rows, where $$\delta \hat{u}_{dy}^c(y) \in Y.$$

The y-axis shift may be recovered by minimizing the following loss function:

$$E(\mathcal{U}^{dy}) = \sum_y \left[1 - S_y^{dy}\left(\delta u_{dy}^c(y)\right)\right] + \lambda \sum_{y,y'} V_{y,y'}\left(\delta u_{dy}^c(y), \delta u_{dy}^c(y')\right)$$

where the solution for the above loss function is:

$$\hat{\mathcal{U}}^{dy} = \underset{\mathcal{U}^{dy}}{\operatorname{argmin}}\left(E(\mathcal{U}^{dy})\right)$$

All other terms in the above equation are analogous to the terms discussed herein in connection with Equation 11. The x-axis shifts may be computed using the recovered y-axis shifts.

$$U^{dx} = \{\delta \hat{u}_{dx}^c(y)\} \forall_y$$

may denote the set of all x-axis shifts, where $$\delta \hat{u}_{dx}^c(y) \in X \text{ and } X = (X_r)x_{r\,r=0}^{R-1}.$$

The similarity measure for the x-axis shifts is given by:

$$S_y^{dx}(x_r) = O_y\left(x_r, \delta \hat{u}_{dy}^c(y)\right)$$

The value of $\hat{U}^{dx}$ may be received by minimizing the loss function:

$$E(\mathcal{U}^{dx}) = \sum_{y}\left[1 - S_{y}^{dx}(\delta\hat{u}_{dx}^{c}(y))\right] + \lambda\sum_{y,y'} V_{y,y'}(\delta\hat{u}_{dx}^{c}(y), \delta\hat{u}_{dx}^{c}(y'))$$

where the loss function uses:

$$\hat{\mathcal{U}}^{dx} = \underset{\mathcal{U}^{dx}}{\operatorname{argmin}}\left(E(\mathcal{U}^{dx})\right)$$

In non-limiting embodiments, after recovering the coarse level shifts, the fine level shifts $\delta\hat{u}^{f}(y)$ are recovered as described above with modification as follows. The set of fine level shifts V may now be set to a sub-pixel resolution (e.g. V={(−0.5,−0.5), (−0.5,−0.4), . . . , (0.5, 0.5)}. Recovery may be performed using Equations 11 and 13, along with an augmented modification of Equation 12 that accounts for the coarse level shifts:

$$S_{y}(v_{m}) = ZNCC\left(\bar{I}_{RS}(x, t_{n}^{rs}), \bar{I}_{GS}(x + \delta\hat{u}^{c}(y) + v_{m}, t_{k}^{gs})\right)$$

The recovered shifts $\delta\hat{u}^{f}(y)$ may be added to the coarse level shifts using Equation 1 to yield a final result.

In some examples, high-amplitude motions may cause a single reference frame to be insufficient for recovering all row shifts in frame n. Therefore, using multiple frames improves signal recovery by increasing the chance that all rolling-shutter rows in frame n will have a corresponding overlap in one of the reference frames. Using all of the reference frames for recovering each rolling-shutter frame would increase the runtime. Thus, in non-limiting embodiments, recovery may be limited to a set of preference frames selected for each frame n. Selecting the reference frames may depend on the object macro-motion. In non-static examples (e.g., handheld instruments or other objects that may move), the low-frequency motion amplitude may be substantial and span thousands of pixels in both axes, making it unlikely that only temporally adjacent global-shutter frames will contain any overlap with any given rolling-shutter frame n. In scenes with large motions, the value of $R_n$ may be set to the P frames having a timestamp $$t_{k}^{GS}$$

closest to $$t_{n}^{RS}.$$

In scenes where the low-frequency motion amplitude of the object is low (e.g., a tuning fork, speaker membrane, or the like), the global speckle pattern drift across time may be relatively small, spanning just a few dozen pixels. Therefore, for each rolling-shutter frame n, the set of relevant reference frames which may have significant overlap with frame n is larger than in the non-static case. Two reference frames $k_1$ and $k_2$ having nearly identical global shifts $$u(t_{k1}^{GS}) \approx u(t_{k2}^{GS})$$

will likely have similar overlaps with frame n, and thus will contribute redundant information. Instead, in such examples, P frames may be selected that provide the larger cover of the two-dimensional speckle pattern.

For the following, the value $R_n=\{k_0, k_1, \ldots, kq_1\}$ denotes a set of Q temporally closer reference frames to frame n, where Q>P. Without loss of generality indices in $R_n$ may be ordered by the proximity of the frame's timestamp to $$t_{n}^{rs},$$

such that $k_0$ belongs to the reference frame having a time stamp $$t_{k0}^{GS}$$

closest to $$t_{n}^{rs}.$$

The P reference frames may be selected from $R_n$ as shown in Algorithm 1 to iteratively select reference frames having a global shift farthest away from all of the shifts in the selected reference frames. As an example, P may be set to 15 for all scenes and Q may be set to 30 for static scenes. It will be appreciated that various values may be used.

Algorithm 1 Selecting P reference frames from $\tilde{R}_n$

1: Initialize $R_n \leftarrow \emptyset$,
2: Initialize $\tilde{R}_n \leftarrow \{k_0, k_1, \ldots, k_{Q-1}\}$.
3. Add closest frame index to $R_n \leftarrow R_n \cup k_0$
4. Subtract closest frame index from $\tilde{R}_n \leftarrow \tilde{R}_n \setminus k_0$
5: while $\|R_n\| < P$ do
6: Find index $k_j \in \tilde{R}_n$ that is farthest from the set $R_n$, $$k_j = \underset{k_j \in \tilde{R}_n}{\operatorname{argmax}} \min_{k_1 \in \tilde{R}_n}\left(\left|u(t_{k_1}^{gs}) - u(t_{k_j}^{gs})\right|\right)$$

7: Add $k_j$ to $R_n \leftarrow R_n \cup k_j$
8: Subtract $k_j$ from $\tilde{R}_n - R_n \setminus k_j$
9: end while At step 308 of FIG. 3, the vibration of the one or more objects is determined. This may include storing vibration frequencies as the motion is tracked over time. In some examples, one or more transformation functions may be applied to the vibration frequencies. In non-limiting embodiments, a soundwave may be formed from the vibration frequencies with or without transformation. The soundwave may be recorded, replayed, and/or the like.

In non-limiting embodiments, the recovered speckle shifts may be processed for audio replay. A high-pass filter may be applied to filter out low-frequency macro-motions of the object. The rolling-shutter dead-time between subsequent frames may be interpolated using an ad hoc method based on Fourier interpolation or a technique based on fitting an autoregressive model. Large spikes may be identified in the measurements using a detection algorithm that compares the levels to a threshold based on the difference between the original and a median-filtered signal. The detected spikes may then be removed and new values may be interpolated for those timestamps. In some non-limiting examples, audio editing software may be used to crop the audio and apply a denoising function that generates a noise profile using a short interval of silence and subtracts the resulting profile in FFT-domain. During denoising, the noise profile may be generated once and applied to other recoveries in the same environment.

In non-limiting embodiments, vibrations may be captured and replayed that originate from audio sources (e.g., speakers, instruments, human voices, and/or the like). For example, in one possible implementation, the system for optical vibration sensing may be configured to point at one or more speaker membranes. In an example with two speakers, a laser may be split (e.g., via diffraction grating) into two points on two different speaker membranes simultaneously. Such an arrangement may result in capture of a larger frequency range than is possible with a standard microphone, which may not be able to detect and record low frequencies (e.g., 33 Hz-65 Hz) due to a less-sensitive frequency response.

In non-limiting embodiments, the systems and methods described herein may be used to record musical instruments from a distance. For example, an acoustic instrument (e.g., a violin, guitar, piano, and/or the like) may be used as the object on which a light (e.g., speckle) is projected. Multiple instruments may be recorded at once. For example, numerous instruments in an orchestra may be recorded individually and mixed for a high-fidelity recording.

In non-limiting embodiments, the systems and methods described herein may be used to monitor machines and/or structures. For example, multiple machines (e.g., engines, robotics, and/or the like) in a factory may be monitored with a system for optically sensing vibrations to allow for problems (e.g., higher vibrations than typical) to be automatically detected. Structures (e.g., bridges, buildings, and/or the like) may be monitored to allow for structural defects to be detected based on changes to the vibration amplitude and/or frequency overtime. In such examples, predetermined threshold values may be used to compare to real-time vibrations such that, when a threshold is satisfied (e.g., met or exceeded), an alarm and/or notification may be automatically generated and/or communicated.

In non-limiting embodiments, the systems and methods described herein may be used to monitor living beings, such as monitoring a heartbeat and/or other physiological conditions of a patient. It will be appreciated that other applications of the systems and methods described herein are possible.

Figure 6:
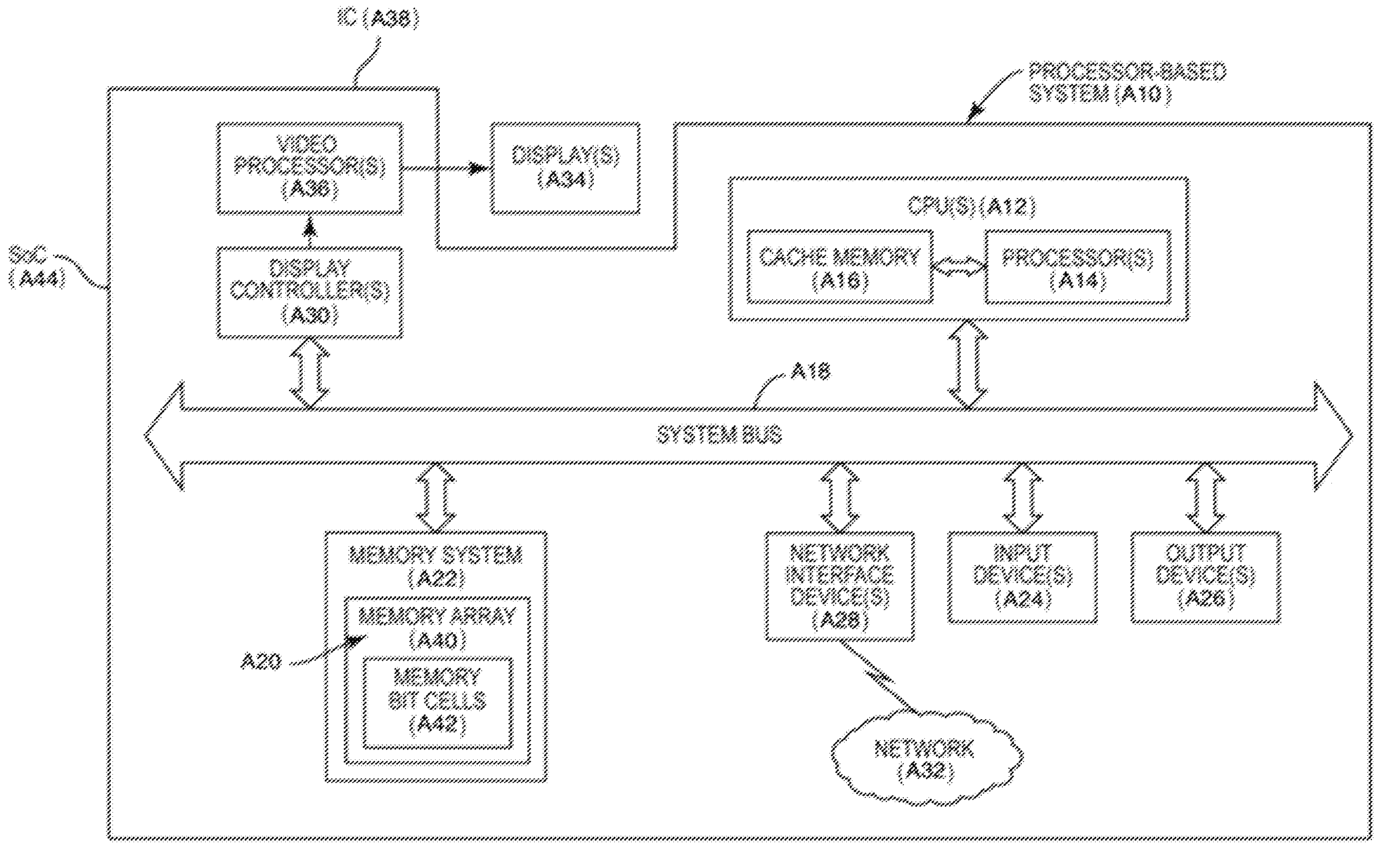
FIG. 6 illustrates an example processor-based system that can employ systems for optical vibration sensing according to non-limiting embodiments or aspects.

FIG. 6 illustrates a non-limiting example of a processor-based system A10 that can employ systems for generating modified light emissions and methods thereof as described herein. In this example, the processor-based system A10 includes one or more central processing units (CPUs) A12, each including one or more processors A14. The CPU(s) A12 may be a master device. The CPU(s) A12 may have cache memory A16 coupled to the processor(s) A14 for rapid access to temporarily stored data. The CPU(s) A12 is coupled to a system bus A18 and can intercouple master and slave devices included in the processor-based system A10. As is well known, the CPU(s) A12 communicates with these other devices by exchanging address, control, and data information over the system bus A18. For example, the CPU(s) A12 can communicate bus transaction requests to a memory controller A20 as an example of a slave device. Although not illustrated in FIG. 6, multiple system buses A18 could be provided, wherein each system bus A18 constitutes a different fabric.

Other master and slave devices can be connected to the system bus A18. As illustrated in FIG. 6, these devices can include a memory system A22, one or more input devices A24, one or more output devices A26, one or more network interface devices A28, and one or more display controllers A30, as examples. The input device(s) A24 can include any type of input device, including, but not limited to, input keys, switches, voice processors, etc. The output device(s) A26 can include any type of output device, including, but not limited to, audio, video, other visual indicators, etc. The network interface device(s) A28 can be any device configured to allow exchange of data to and from a network A32. The network A32 can be any type of network, including, but not limited to, a wired or wireless network, a private or public network, a local area network (LAN), a wireless local area network (WLAN), a wide area network (WAN), a BLUETOOTH® network, and the Internet. The network interface device(s) A28 can be configured to support any type of communications protocol desired. The memory system A22 can include one or more memory units.

The CPU(s) A12 may also be configured to access the display controller(s) A30 over the system bus A18 to control information sent to one or more displays A34. The display controller(s) A30 sends information to the display(s) A34 to be displayed via one or more video processors A36, which process the information to be displayed into a format suitable for the display(s) A34. The display(s) A34 can include any type of display, including, but not limited to, a cathode ray tube (CRT), a liquid crystal display (LCD), a plasma display, a light emitting diode (LED) display, etc. The processor-based system(s) A10 may also be provided in an integrated circuit (IC) A38. The memory system A22 may include a memory array(s) A40 and/or memory bit cells A42. The processor-based system(s) A10 may also be provided in a system-on-a-chip (SoC) A44.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or a combination(s) of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system comprising:

a first visual sensor;

a second visual sensor; and at least one processor in communication with the first visual sensor and the second visual sensor, the at least one processor configured to:

simultaneously emit a plurality of lights into an environment comprising a plurality of objects, such that a first light of the plurality of lights is emitted on a first object of the plurality of objects and a second light of the plurality of lights is emitted on a second object of the plurality of objects;

capture, with the first visual sensor, at least one first image comprising the first light on the first object and the second light on the second object;

capture, with the second visual sensor and simultaneous with capturing the at least one first image, at least one second image comprising the first light on the first object and the second light on the second object; and determine a vibration of the first object based on the first light captured in the at least one first image and the at least one second image, and a vibration of the second object based on the second light captured in the at least one first image and the at least one second image.

2. The system of claim 1, further comprising relay optics configured to split a captured image plane as input to the first visual sensor and the second visual sensor.

3. The system of claim 1, wherein the first visual sensor comprises a rolling-shutter camera, and wherein the second visual sensor comprises a global-shutter camera.

4. The system of claim 3, further comprising;

a cylindrical lens arranged in a field-of-view of the first visual sensor and the second visual sensor, the cylindrical lens configured to expand at least one of the first light and the second light across a vertical plane of the field-of-view.

5. The system of claim 1, wherein the first visual sensor comprises a line camera, and wherein the second visual sensor comprises a global-shutter camera.

6. The system of claim 1, wherein the at least one processor is configured to:

track a motion of at least one of the first light and the second light with the second visual sensor; and determine at least one high-frequency two-dimensional shift of the at least one of the first light and the second light based on tracking the at least one of the first light and the second light, wherein determining the vibration of at least one of the first object and the second object is based on the at least one high-frequency two-dimensional shift.

7. The system of claim 1, further comprising:

at least one membrane arranged a distance from the first visual sensor and the second visual sensor, the plurality of objects comprising the at least one membrane.

8. The system of claim 7, wherein the at least one membrane comprises a plurality of membranes arranged in the environment, the plurality of objects comprising the plurality of membranes, further comprising at least one optical device configured to emit the first light as a first plurality of lights on at least a first subset of membranes of the plurality of membranes in a first configuration and the second light as a second plurality of lights on at least a second subset of membranes of the plurality of membranes in a second configuration.

9. The system of claim 1, wherein the at least one processor is further configured to:

recover at least one soundwave based on the vibration of the first object and the vibration of the second object; and at least one of record and playback the at least one soundwave.

10. A method comprising:

simultaneously emitting a plurality of lights into an environment comprising a plurality of objects, such that a first light of the plurality of lights is emitted on a first object of the plurality of objects and a second light of the plurality of lights is emitted on a second object of the plurality of objects;

capturing at least one first image comprising the first light on the first object and the second light on the second object with a first visual sensor;

simultaneously while capturing the at least one first image, capturing at least one second image comprising the first light on the first object and the second light on the second object with a second visual sensor;

determining a vibration of the first object based on the first light captured in the at least one first image and the at least one second image, and a vibration of the second object based on the second light captured in the at least one first image and the at least one second image.

11. The method of claim 10, further comprising:

splitting a captured image plane as input to the first visual sensor and the second visual sensor using relay optics.

12. The method of claim 10, wherein the first visual sensor comprises a rolling-shutter camera, and wherein the second visual sensor comprises a global-shutter camera.

13. The method of claim 12, further comprising:

arranging a cylindrical lens in a field-of-view of at least one of the first visual sensor and the second visual sensor, the cylindrical lens configured to expand at least one of the first light and the second light across a vertical plane of the field-of-view.

14. The method of claim 10, wherein the first visual sensor comprises a line camera, and wherein the second visual sensor comprises a global-shutter camera.

15. The method of claim 10, further comprising:

tracking a motion of at least one of the first light and the second light with the first visual sensor; and determining at least one high-frequency two-dimensional shift of the at least one of the first light and the second light based on tracking the motion, wherein determining the vibration of at least one of the first object and the second object is based on the at least one high-frequency two-dimensional shift.

16. The method of claim 10, wherein the plurality of objects comprise at least one membrane, further comprising:

arranging the at least one membrane a distance from the first visual sensor and the second visual sensor.

17. The method of claim 16, wherein the at least one membrane comprises a plurality of membranes, the plurality of objects comprising the plurality of membranes, further comprising:

controlling at least one optical device to emit the first light as a first plurality of lights on at least a first subset of membranes of the plurality of membranes in a first configuration and the second light as a second plurality of lights on at least a second subset of membranes of the plurality of membranes in a second configuration.

18. The method of claim 10, further comprising:

recovering at least one soundwave based on the vibration of the first object and the vibration of the second object; and at least one of recording and playing back the at least one soundwave.

19. A computer program product comprising at least one non-transitory computer-readable medium including program instructions that, when executed by at least one processor, cause the at least one processor to:

simultaneously emit a plurality of lights into an environment comprising a plurality of objects, such that a first light of the plurality of lights is emitted on a first object of the plurality of objects and a second light of the plurality of lights is emitted on a second object of the plurality of objects;

capture at least one first image comprising the first light on the first object and the second light on the second object with a first visual sensor;

capture at least one second image comprising the first light on the first object and the second light on the second object with a second visual sensor simultaneous with capturing the at least one first image; and determine a vibration of the first object based on the first light captured in the at least one first image and the at least one second image, and a vibration of the second object based on the second light captured in the at least one first image and the at least one second image.

* * * * *